(12) United States Patent
Mohammed (10) Patent No.: US 11,213,119 B1
(45) Date of Patent: Jan. 4, 2022

(54) CUP HOLDER CLEANING TOOL

(71) Applicant: Nasir Mohammed, Doha (QA)

(72) Inventor: Nasir Mohammed, Doha (QA)

( * ) Notice: Subject to any disclaimer, the term of this patent is extended or adjusted under 35 U.S.C. 154(b) by 237 days.

(21) Appl. No.: 16/716,608

(22) Filed: Dec. 17, 2019

(51) Int. Cl.
| | |
|---|---|
| *A46B 13/04* | (2006.01) |
| *B08B 1/04* | (2006.01) |
| *B08B 9/087* | (2006.01) |
| *B08B 9/08* | (2006.01) |
| *B08B 9/093* | (2006.01) |

(52) U.S. Cl.
CPC ............ *A46B 13/04* (2013.01); *B08B 1/04* (2013.01); *B08B 9/087* (2013.01); *B08B 9/0808* (2013.01); *B08B 9/093* (2013.01)

(58) Field of Classification Search
CPC ......... A46B 13/04; A47L 15/37; A47L 15/39; B08B 1/04; B08B 9/08; B08B 9/0808; B08B 9/087; B08B 9/093; B08B 9/28; B08B 9/34; B08B 9/36
USPC ................. 15/320, 24, 29, 56, 65, 71, 72
See application file for complete search history.

(56) References Cited

U.S. PATENT DOCUMENTS

| | | | | |
|---|---|---|---|---|
| 1,627,112 A | * | 5/1927 | Parodi ................ | A47L 15/0068 15/56 |
| 2,104,272 A | | 1/1938 | Partridge | |
| 2,911,665 A | * | 11/1959 | Mackiewicz .......... | A46B 13/04 15/321 |
| 2,955,304 A | * | 10/1960 | Noe ........................ | A47L 15/39 15/75 |
| 4,791,693 A | | 12/1988 | Kvaternik | |
| 5,156,634 A | | 10/1992 | Yang | |
| 5,315,729 A | | 5/1994 | Yang | |
| 5,701,625 A | * | 12/1997 | Siman .................... | A46B 13/02 15/21.1 |
| 5,881,418 A | * | 3/1999 | Enoch .................... | A46B 13/04 15/101 |
| 6,170,107 B1 | | 1/2001 | George et al. | |
| 7,152,266 B1 | | 12/2006 | Haughton | |
| 7,356,867 B1 | | 4/2008 | Beiermann | |
| 7,571,508 B1 | | 8/2009 | Yufa | |
| 8,245,344 B2 | | 8/2012 | Kilpatrick | |
| 8,256,056 B2 | | 9/2012 | Jones | |
| 8,261,395 B2 | | 9/2012 | Lazarre | |
| 8,984,695 B2 | | 3/2015 | Manning | |

* cited by examiner

*Primary Examiner* — Mark Spisich (74) *Attorney, Agent, or Firm* — Cramer Patent & Design, PLLC; Aaron R. Cramer (57) ABSTRACT

A cleaning tool utilizes an electrical motor in communication with a power supply secured to a lengthwise adjustable arm secured in turn to a collapsible and foldable cleaning head. The cleaning head comprises a plurality of brush heads perpendicularly secured in a radial array beneath a brush head support plate of the cleaning head. The cleaning tool is particularly suited to clean a cup holder.

20 Claims, 6 Drawing Sheets

CUP HOLDER CLEANING TOOL

RELATED APPLICATIONS

None.

FIELD OF THE INVENTION

The present invention relates generally to a cleaning tool and more specifically to a cup holder cleaning tool.

BACKGROUND OF THE INVENTION

Among the many chores that we all must face is the task of keeping our cars clean and good-looking. For many Americans, their car is a source of personal pride and keeping it good looking is not just a chore, it is an obsession. This obsession of course includes the interior of the car as well. The upholstery and carpeting must be vacuumed and periodically cleaned to keep it looking its best. Dashes and instrument panels must be wiped down and brushed to remove all traces of dust and dirt. One other area that is prone to collecting spills and debris is that of the cup holders. However, no matter how much vacuuming, wiping, and brushing one does, there always seems to be some remaining contamination that remains stuck to the sides due to the tight configuration of the cupholder. Accordingly, there exists a need for a means by which cupholders in motor vehicles can be easily cleaned. The development of the cup holder cleaning device fulfills this need.

SUMMARY OF THE INVENTION

In view of the foregoing disadvantages inherent in the prior art, it has been observed that there is need for a cup holder cleaning device which comprises a cleaning head which is provided with an upper disc having a plurality of upper brush arms and a plurality of lower brush arms resulting in movement of a plurality of brush heads along an expansion and contraction travel path as the upper disc is moved along an up and down travel path, an upper enclosure which supplies a cleaning solution as well as a used cleaning solution that are accessed through a cleaning solution reservoir cap and the used cleaning solution reservoir cap respectively and a main shaft which is rotated as driven by the upper enclosure to produce a cleaning travel path. The main shaft is secured via an upper bearing and a lower bearing which allows for rotation of the main shaft along a rotation travel path.

The cup holder cleaning device also comprises a diameter adjustment mechanism which is mounted to a center portion of the upper disc and clamps to a plurality of different locations on the upper disc. The diameter adjustment mechanism is manipulated and the upper brush arm which produces a variable cleaning radius to accommodate a plurality of cup holder diameters. The solutions are introduced and received from a cup holder via a cleaning solution supply tube and a used cleaning solution vacuum tube. A cleaning solution supply tube and the used cleaning solution vacuum tube are lowered into the cup holder by a tube height adjustment mechanism lever on the front of the upper enclosure. The cleaning solution supply tube and the used cleaning solution vacuum tube are respectively contained within a cleaning solution tube containment cylinder and a used cleaning solution vacuum tube containment cylinder.

The cup holder cleaning device also comprises a brush motor control switch, a cleaning solution pump control switch, and a used cleaning solution pump control switch which are supplied on a side of the upper enclosure. The cleaning solution supply tube and the used cleaning solution vacuum tube are routed within the main shaft whereupon they enter the upper enclosure. The cup holder cleaning device also comprises a first gear which is permanently attached to the perimeter of the main shaft and is driven by a second gear which is connected to a brush motor which provides mechanical rotation force and a tubing slack area for both the cleaning solution supply tube and the used cleaning solution vacuum tube which allows for said second tube travel path to occur without binding.

The upper brush arms may be in the range of 3 to 8 of the upper brush arms while the lower brush arms are in the range of 3 to 8 of the lower brush arms. The cup holder cleaning device may further comprise a first position of the brush heads which are capable of contacting a vertical surface of the cup holder. The cup holder cleaning device further comprises a second position of the brush heads which are capable of contacting a horizontal surface of the cup holder. Once a satisfactory diameter of the brush heads is reached, the diameter adjustment mechanism may be locked in position, which holds the position in place during the entire cleaning process.

The diameter adjustment mechanism may be locked in position by a locking thumbscrew. The upper enclosure may be made of plastic. The cleaning solution reservoir and the used cleaning solution reservoir may contain cleaning solution and the used cleaning solution respectively and may be capped by the cleaning solution reservoir cap and the used cleaning solution reservoir cap respectively. The cleaning solution supply tube and the used cleaning solution vacuum tube may be adjustable up and down along a first tube travel path. The tube height adjustment mechanism may allow for stabilized motion of the cleaning solution supply tube and the used cleaning solution vacuum tube up and down along a second tube travel path which accommodates and is directly proportional to the first tube travel path.

The cleaning solution tube containment cylinder and the used cleaning solution vacuum tube containment cylinder may be contained within a series of bearing inserts which may be periodically spaced within the main shaft. The bearing insert may be a ball bearing or may be a roller bearing. The main shaft may spin in an axial manner to drive the upper disc and thus the brush heads while the cleaning solution supply tube inside the cleaning solution tube containment cylinder and the used cleaning solution vacuum tube inside the used cleaning solution vacuum tube containment cylinder remain stationary.

The cleaning solution supply tube and the used cleaning solution vacuum tube may be extended through a tube height adjustment mechanism which is mechanically coupled to the tube height adjustment mechanism lever. The cleaning solution supply tube continue on to a cleaning solution pump and a used cleaning solution pump respectively which may provide pressure and vacuum respectively, and then continue onto a cleaning solution reservoir and a used cleaning solution reservoir. The electrical power may be derived from a 12-VDC plug which is provided with an internal fuse for overcurrent protection. The brush motor control switch, the cleaning solution pump control switch, and the used cleaning solution pump control switch may be wired in a series fashion with the brush motor, the cleaning solution pump and the used cleaning solution pump, where a return conductor to the 12-VDC plug completes the circuit. The resultant power may be routed along a power cord where it is split in a parallel manner to the brush motor control switch, the cleaning solution pump control switch and the used cleaning solution pump control switch.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 cup holder cleaning device
15 cup holder
20 cleaning head
25 main shaft
30 upper enclosure
35 upper disc
40 upper brush arm
45 diameter adjustment mechanism
50 cleaning travel path "c"
55 power cord
60 12 VDC plug
65 cleaning solution reservoir cap
70 used cleaning solution reservoir cap
75 cleaning solution supply tube
80 used cleaning solution vacuum tube
85 tube height adjustment mechanism lever
90 brush motor control switch
95 cleaning solution pump control switch
100 used cleaning solution pump control switch
105 brush heads
110 lower brush arm
115 pivot points
120 expansion/contraction travel path "ec"
125 up/down travel path "ud"
130 locking thumbscrew
135 supply arrow
140 return arrow
145 first tube travel path "t1"
150 cleaning solution tube containment cylinder
155 used cleaning solution vacuum tube containment cylinder
160 bearing insert
165 rotation travel path "r"
170 upper bearing
175 lower bearing
180 first gear
185 second gear
190 brush motor
195 tube height adjustment mechanism
200 second tube travel path "t2"
205 tubing slack area
210 cleaning solution pump
215 used cleaning solution pump
220 cleaning solution reservoir
225 used cleaning solution reservoir
230 cleaning solution
235 used cleaning solution
240 fuse

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Figure 1:
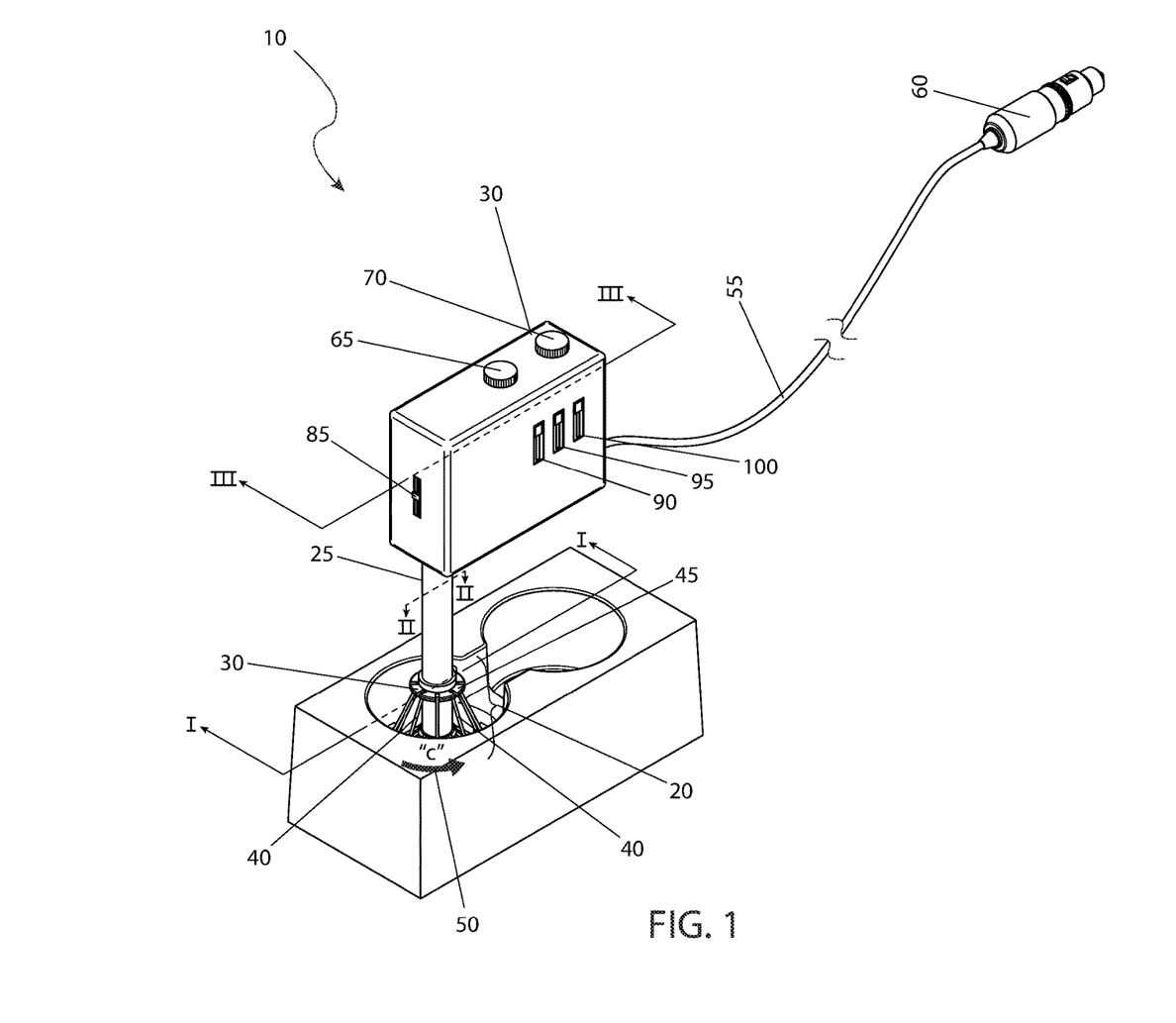
FIG. 1 is a perspective view of the cup holder cleaning device 10, shown in a utilized state, according to the preferred embodiment of the present invention.

Referring now to FIG. 1, a perspective view of the cup holder cleaning device 10, shown in a utilized state, according to the preferred embodiment of the present invention is disclosed. The cup holder cleaning device 10 (herein also described as the "device") 10, is utilized on a cup holder 15 of a motor vehicle. The device 10 includes three (3) main components: a cleaning head 20, a main shaft 25, and an upper enclosure 30. The cleaning head 20 is provide with an upper disc 35, to which between three (3) and eight (8) upper brush arms 40 are attached. A diameter adjustment mechanism 45 is mounted to the center portion of the upper disc 35 and clamps to different locations on the upper disc 35. As the diameter adjustment mechanism 45 is manipulated, the upper brush arm 40 produce a variable cleaning radius to accommodate cup holder 15 of different diameters. The main shaft 25 rotates as driven by the upper enclosure 30 to produce a cleaning travel path "c" 50.

The upper enclosure 30 is envisioned to be of an overall plastic construction. It is electrically powered by a power cord 55 and a 12-VDC plug 60 which connects to the cigarette lighter of the vehicle in which the device 10 is being used. The upper enclosure 30 is capable of supplying cleaning solution as well as vacuuming up used cleaning solution. These solutions are accessed through a cleaning solution reservoir cap 65 and a used cleaning solution reservoir cap 70 respectively. These solutions are introduced and received from the cup holder 15 via cleaning solution supply tube 75 (not shown in this figure due to illustrative limitations) and a used cleaning solution vacuum tube 80 (not shown in this figure due to illustrative limitations). The cleaning solution supply tube 75 and the used cleaning solution vacuum tube 80 are lowered into the cup holder 15 by a tube height adjustment mechanism lever 85 on the front of the upper enclosure 30. A brush motor control switch 90, a cleaning solution pump control switch 95, and a used cleaning solution pump control switch 100 are supplied on the side of the upper enclosure 30. Further operation of the tube height adjustment mechanism lever 85, the brush motor control switch 90, the cleaning solution pump control switch 95, and the used cleaning solution pump control switch 100 will be provided herein below.

Figure 2A:
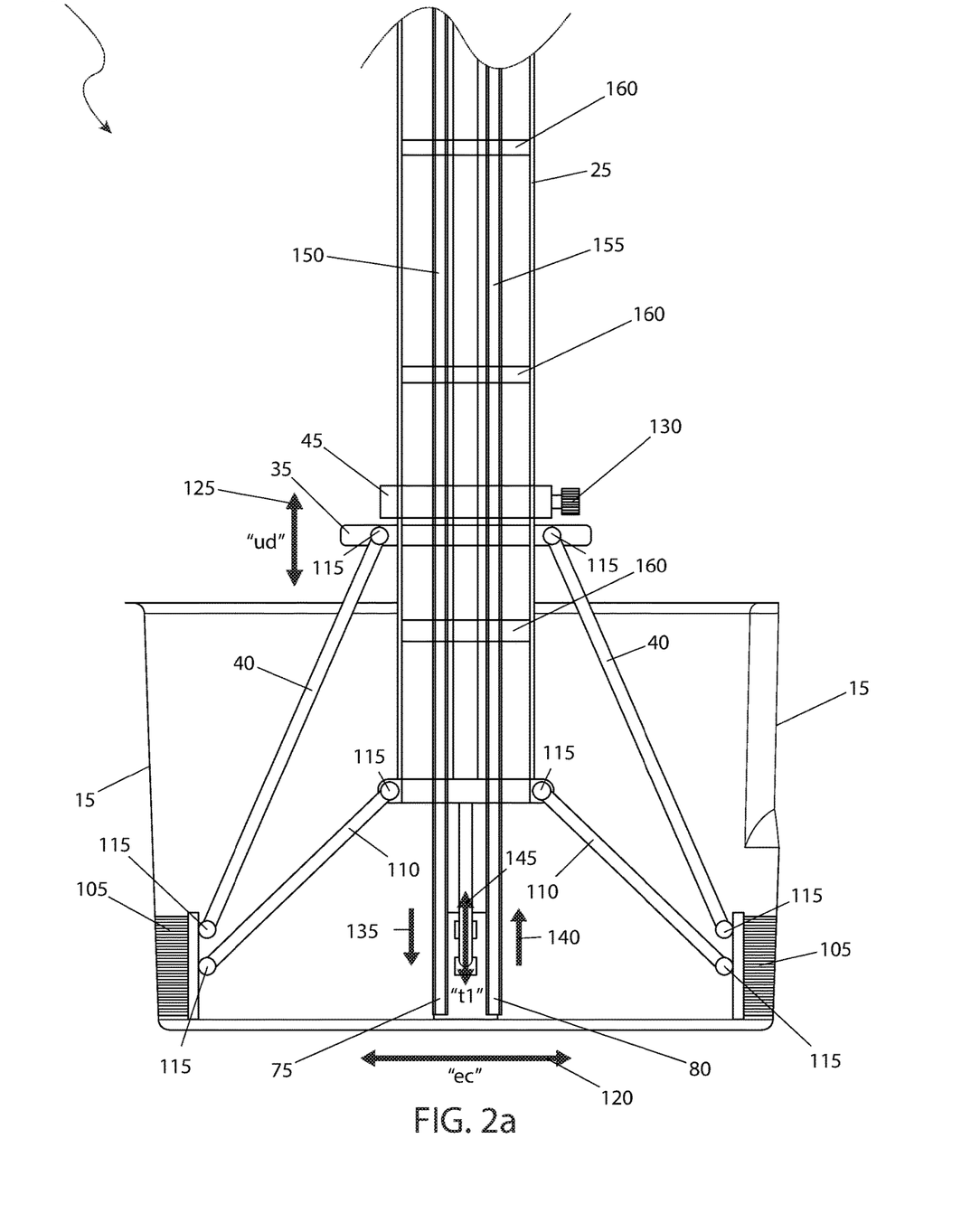
FIG. 2a is a sectional view of the cup holder cleaning device 10, as seen along a line I-I, as shown in FIG. 1 showing a first position of the brush heads 105, according to the preferred embodiment of the present invention.
Figure 2B:
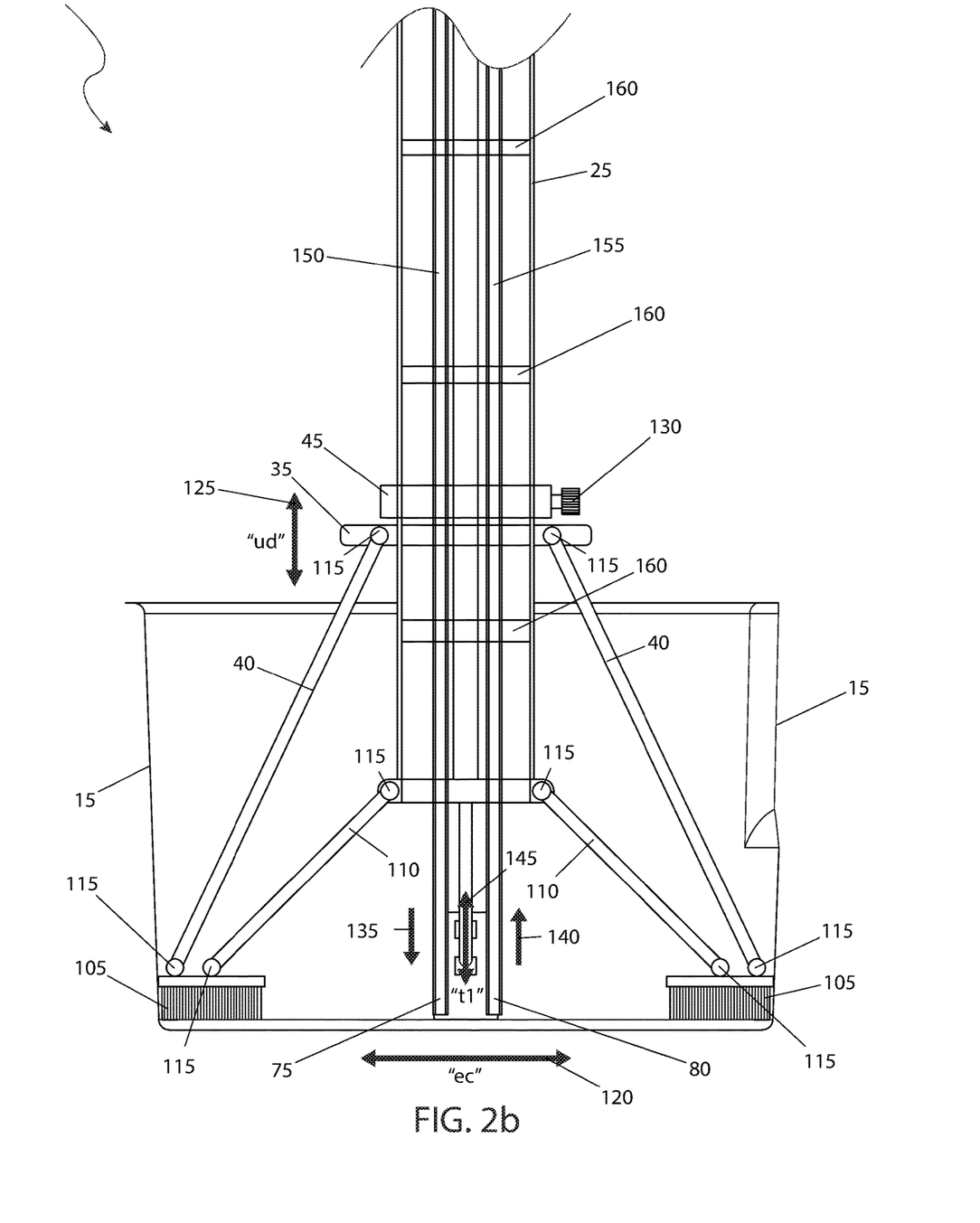
FIG. 2b is another sectional view of the cup holder cleaning device 10, similar as in FIG. 2a, showing a second position of the brush heads 105, according to the preferred embodiment of the present invention.

Referring next to FIGS. 2a and 2b, sectional views of the device 10, as seen along a line I-I, as shown in FIG. 1, according to the preferred embodiment of the present invention is depicted. The brush heads 105 (quantity of two (2) depicted for illustrative clarity; between three (3) and eight (8) utilized) are attached to the upper brush arm 40 (quantity of two (2) depicted for illustrative clarity; between three (3) and eight (8) utilized), and also a lower brush arm 110 (quantity of two (2) depicted for illustrative clarity; between three (3) and eight (8) utilized) via multiple pivot points 115. This arrangement results in movement of the brush heads 105 along an expansion/contraction travel path "ec" 120 as the upper disc 35, with its diameter adjustment mechanism 45, is moved along a up/down travel path "ud" 125. A first position of the brush heads 105, as indicated in FIG. 2a, is where the brush heads 105 are capable of contacting a vertical surface of the cup holder 15. A second position of the brush heads 105, as indicated in FIG. 2b, is where the brush heads 105 are capable of contacting a horizontal surface of the cup holder 15.

Once a satisfactory diameter of the brush heads 105 are reached, the diameter adjustment mechanism 45 is locked in position by a locking thumbscrew 130, which holds the position in place during the entire cleaning process. The cleaning solution supply tube 75 is indicated with a supply arrow 135, while the used cleaning solution vacuum tube 80 is indicated with a return arrow 140. Both the cleaning solution supply tube 75 and used cleaning solution vacuum tube 80 are adjustable up and down along a first tube travel path "t1" 145. This travel will be further explained herein below. The cleaning solution supply tube 75 and the used cleaning solution vacuum tube 80 are contained within a cleaning solution tube containment cylinder 150 and a used cleaning solution vacuum tube containment cylinder 155 respectively. The cleaning solution tube containment cylinder 150 and the used cleaning solution vacuum tube containment cylinder 155 are contained within a series of bearing insert 160, that are periodically spaced within the main shaft 25. As such, as the main shaft 25 spins in an axial manner to drive the upper disc 35 and thus the brush heads 105, the cleaning solution supply tube 75 inside the cleaning solution tube containment cylinder 150 and the used cleaning solution vacuum tube 80 inside the used cleaning solution vacuum tube containment cylinder 155 remain stationary.

Figure 3:
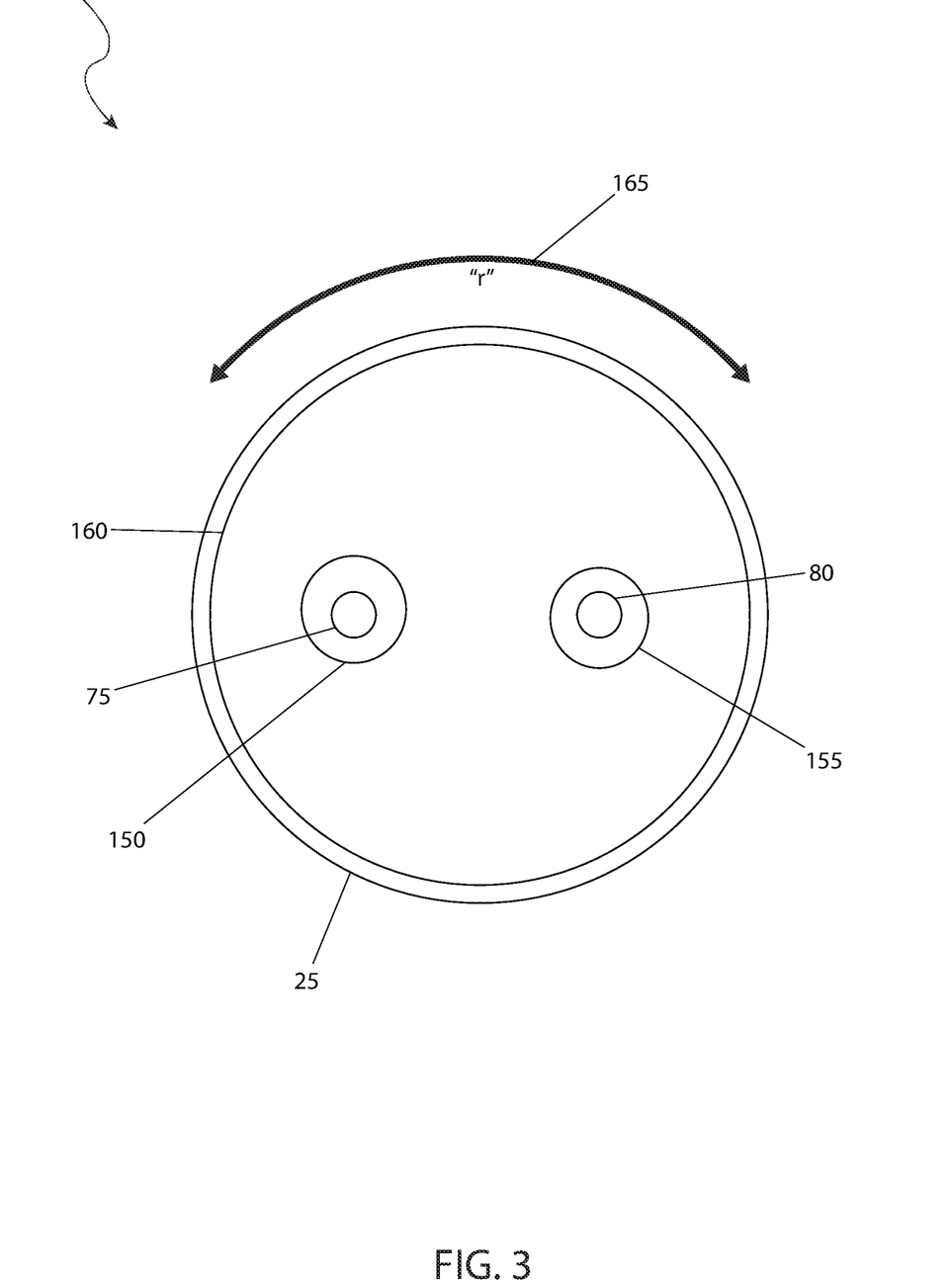
FIG. 3 is a sectional view of the cup holder cleaning device 10, as seen along a line II-II, as shown in FIG. 1, according to the preferred embodiment of the present invention.

Referring now to FIG. 3, a sectional view of the device 10, as seen along a line II-II, as shown in FIG. 1, according to the preferred embodiment of the present invention is shown. This view provides further clarification of the internals of the main shaft 25. As aforementioned described, the cleaning solution supply tube 75 and the used cleaning solution vacuum tube 80 are contained within a cleaning solution tube containment cylinder 150 and a used cleaning solution vacuum tube containment cylinder 155 respectively. The cleaning solution tube containment cylinder 150 and the used cleaning solution vacuum tube containment cylinder 155 are contained within multiple bearing insert 160 (of which only one (1) is shown due to illustrative limitations) within the main shaft 25. As such, as the main shaft 25 spins along a rotation travel path "r" 165, the cleaning solution supply tube 75 inside the cleaning solution tube containment cylinder 150 and the used cleaning solution vacuum tube 80 inside the used cleaning solution vacuum tube containment cylinder 155 remain stationary. It is envisioned that the bearing insert 160 will be a ball bearing, a roller bearing or a similar type. The actual type of bearing insert 160 is not intended to be a limiting factor of the present invention.

Figure 4:
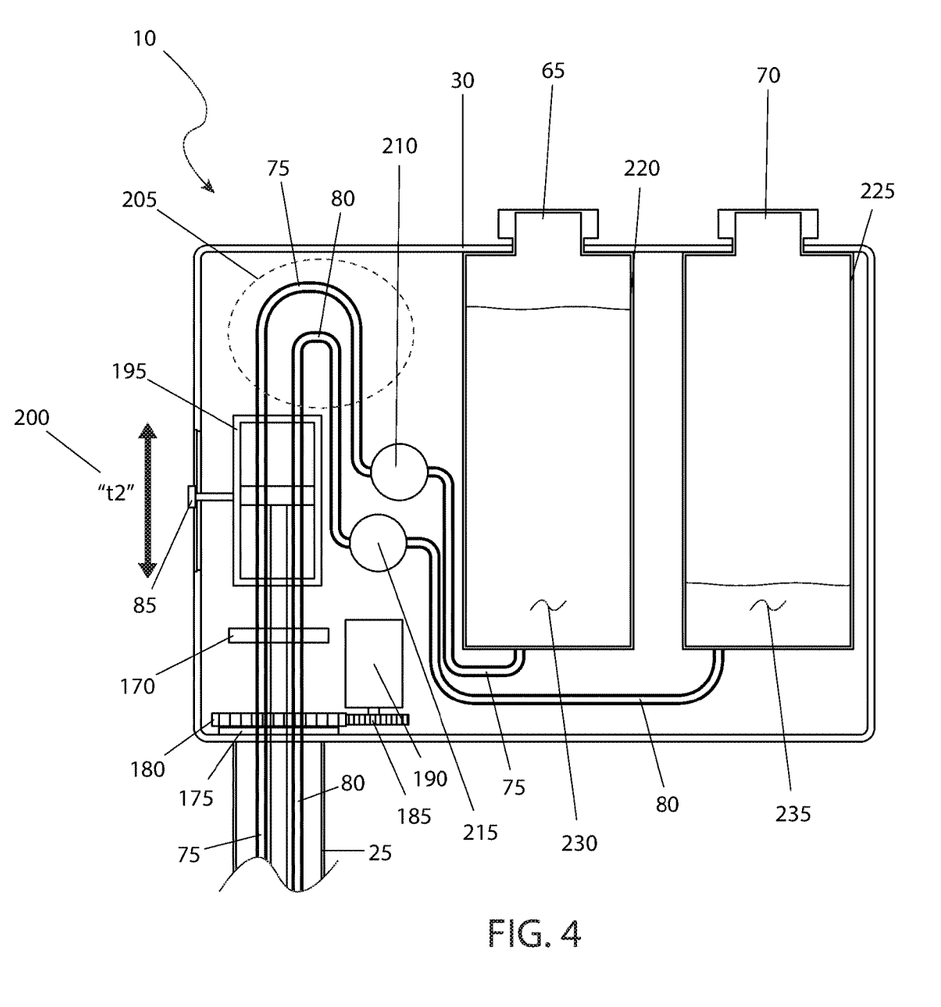
FIG. 4 is a sectional view of the cup holder cleaning device 10, as seen along a line III-III, as shown in FIG. 1, according to the preferred embodiment of the present invention; and, FIG. 5 is an electrical block diagram, depicting the major electrical components of the cup holder cleaning device 10, according to the preferred embodiment of the present invention.

Referring next to FIG. 4, a sectional view of the device 10, as seen along a line III-III, as shown in FIG. 1, according to the preferred embodiment of the present invention is disclosed. The cleaning solution supply tube 75 and the used cleaning solution vacuum tube 80 are routed within the main shaft 25 whereupon they enter the upper enclosure 30. The main shaft 25 is secured via an upper bearing 170 and a lower bearing 175 which allows for rotation of the main shaft 25 along the rotation travel path "r" 165 (as shown in FIG. 3). A first gear 180, permanently attached to the perimeter of the main shaft 25 is driven by a second gear 185 connected to a brush motor 190 which provides mechanical rotation force. The cleaning solution supply tube 75 and the used cleaning solution vacuum tube 80 are extended through a tube height adjustment mechanism 195 which is mechanically coupled to the tube height adjustment mechanism lever 85. The tube height adjustment mechanism 195 allows for stabilized motion of the cleaning solution supply tube 75 and the used cleaning solution vacuum tube 80 up and down along a second tube travel path "t2" 200 which accommodates and is directly proportional to the first tube travel path "t1" 145 (as shown in FIG. 2). A tubing slack area 205 for both the cleaning solution supply tube 75 and the used cleaning solution vacuum tube 80 allow for said second tube travel path "t2" 200 to occur without binding. The cleaning solution supply tube 75 continue on to a cleaning solution pump 210 and a used cleaning solution pump 215 respectively which provide pressure and vacuum respectively, and then continue onto a cleaning solution reservoir 220 and a used cleaning solution reservoir 225. The cleaning solution reservoir 220 and the used cleaning solution reservoir 225 contain cleaning solution 230 and used cleaning solution 235 respectively and are capped by the cleaning solution reservoir cap 65 and the used cleaning solution reservoir cap 70 respectively.

Figure 5:
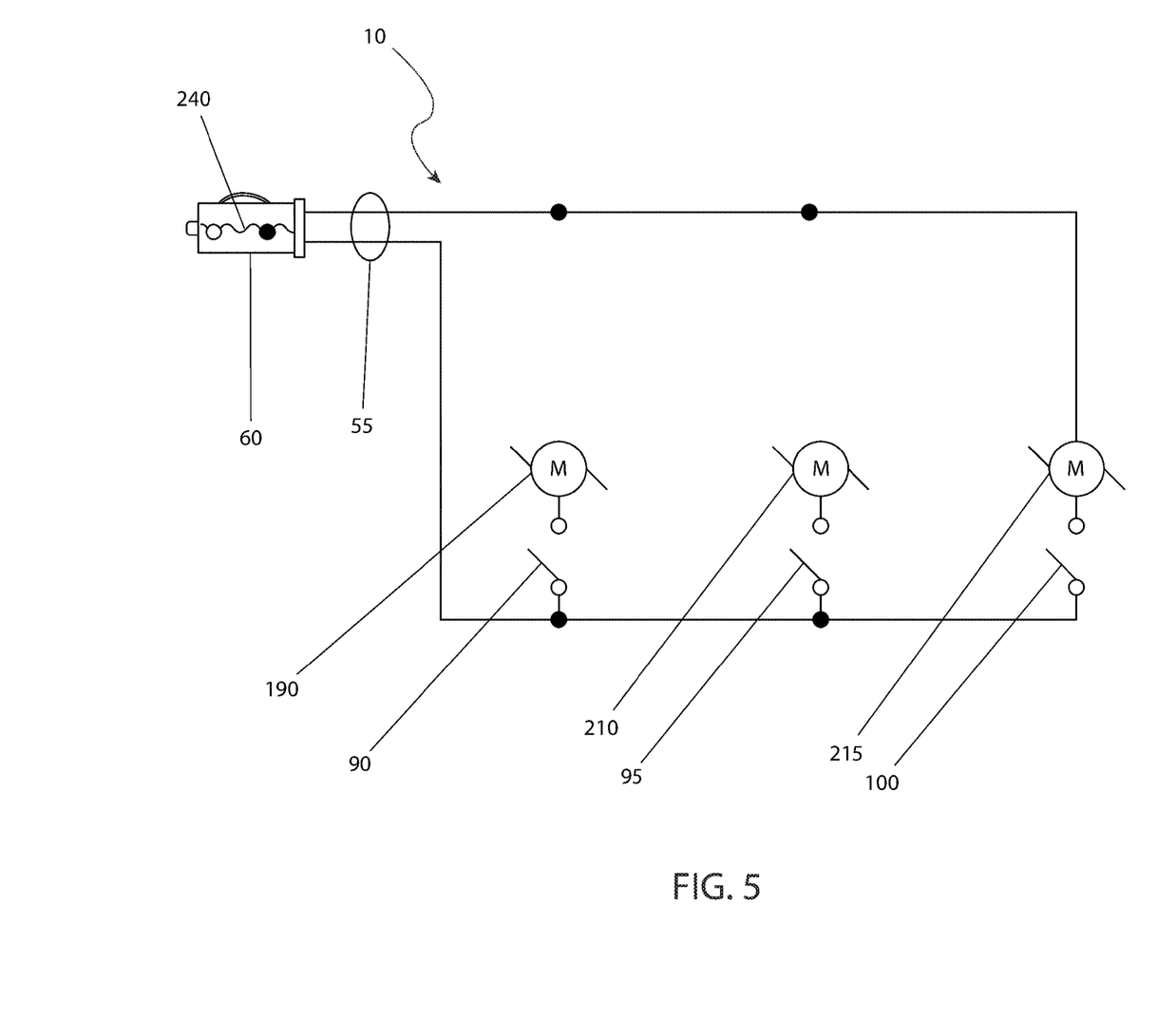

Referring to FIG. 5, an electrical block diagram, depicting the major electrical components of the device 10, according to the preferred embodiment of the present invention is depicted. Electrical power is derived from the 12-VDC plug 60 which is provided with an internal fuse 240 for overcurrent protection. The resultant power is routed along the power cord 55 where it is split in a parallel manner to the brush motor control switch 90, the cleaning solution pump control switch 95 and the used cleaning solution pump control switch 100. The brush motor control switch 90, the cleaning solution pump control switch 95, and the used cleaning solution pump control switch 100 are wired in a series fashion with the brush motor 190, the cleaning solution pump 210, and the used cleaning solution pump 215, where a return conductor to the 12-VDC plug 60 completes the circuit.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 5. The user would procure the device 10 from conventional procurement sources such as auto part stores, discount stores, mail order or internet retailers, or similar locations.

After procurement and prior to utilization, the device 10 would be prepared in the following manner: the cleaning solution reservoir 220 would be filled with cleaning solution 230; the used cleaning solution reservoir 225 would be ensured to be empty or near empty; and the 12-VDC plug 60 would be connected to a suitable source of DC power in the subject motor vehicle.

During utilization of the device 10, the following procedure would be initiated: the cleaning head 20 would be inserted into the cup holder 15; the upper disc 35 would be manipulated along the up/down travel path "ud" 125 until a suitable expansion/contraction travel path "ec" 120 is obtained, which corresponds to the desired location of the surface of the cup holder 15 to be cleaned; the locking thumbscrew 130 is manipulated to lock the diameter adjustment mechanism 45 and thus the upper disc 35 into place; the tube height adjustment mechanism lever 85 is then manipulated to place the distal end of the cleaning solution supply tube 75 and the used cleaning solution vacuum tube 80 directly above the bottom of the cup holder 15; the cleaning solution pump control switch 95 would be activated to pump cleaning solution 230 from the cleaning solution reservoir 220 through the cleaning solution supply tube 75 and into the bottom of the cup holder 15; care must be taken to ensure that the amount of pump cleaning solution 130 does not exceed the capacity of the cup holder 15; the brush motor control switch 90 is then activated to energize the brush motor 190 and thus turn the brush heads 105 to produce a cleaning action; after a suitable period of time, the brush motor control switch 90 is deactivated; the used cleaning solution pump control switch 100 is then activated to energize the used cleaning solution pump 215 and draw the used cleaning solution 235 up from the bottom of the cup holder 15; the used cleaning solution 235 is then routed into the used cleaning solution reservoir 225.

After use of the device 10, it is removed from the cup holder 15 whereupon the cup holder 15 is dried with a towel. The 12-VDC plug 60 is disconnected; used cleaning solution reservoir cap 70 is removed and any used cleaning solution 235 is properly disposed of; any remaining cleaning solution 230 may remain in the cleaning solution reservoir 220 for future use. At this point in time the device 10 may be used on other cup holder 15 or stored away until needed for future use in a cyclical manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A cup holder cleaning device, comprising:
    a cleaning head provided with an upper disc having a plurality of upper brush arms and a plurality of lower brush arms resulting in movement of a plurality of brush heads along an expansion and contraction travel path as the upper disc is moved along an up and down travel path;
    an upper enclosure supplying a cleaning solution as well as a used cleaning solution that are accessed through a cleaning solution reservoir cap and the used cleaning solution reservoir cap respectively;
    a main shaft rotated as driven by the upper enclosure to produce a cleaning travel path, the main shaft is secured via an upper bearing and a lower bearing which allows for rotation of the main shaft along a rotation travel path;
    a diameter adjustment mechanism mounted to a center portion of the upper disc and clamps to a plurality of different locations on the upper disc, the diameter adjustment mechanism is manipulated and the upper brush arms produce a variable cleaning radius to accommodate a plurality of cup holder diameters, the solutions are introduced and received from a cup holder via a cleaning solution supply tube and a used cleaning solution vacuum tube, the cleaning solution supply tube and the used cleaning solution vacuum tube are lowered into the cup holder by a tube height adjustment mechanism lever on the front of the upper enclosure, the cleaning solution supply tube and the used cleaning solution vacuum tube are contained within a cleaning solution tube containment cylinder and a used cleaning solution vacuum tube containment cylinder respectively;
    a brush motor control switch, a cleaning solution pump control switch, and a used cleaning solution pump control switch supplied on a side of the upper enclosure, the cleaning solution supply tube and the used cleaning solution vacuum tube are routed within the main shaft whereupon they enter the upper enclosure;
    a first gear permanently attached to the perimeter of the main shaft is driven by a second gear connected to a brush motor which provides mechanical rotation force; and
    a tubing slack area for both the cleaning solution supply tube and the used cleaning solution vacuum tube allow for movement to occur without binding.

2. The cup holder cleaning device according to claim 1, wherein the upper brush arms are in the range of 3 to 8 of the upper brush arms.

3. The cup holder cleaning device according to claim 1, wherein the lower brush arms are in the range of 3 to 8 of the lower brush arms.

4. The cup holder cleaning device according to claim 1, further comprising a first position of the brush heads are capable of contacting a vertical surface of the cup holder.

5. The cup holder cleaning device according to claim 1, further comprising a second position of the brush heads are capable of contacting a horizontal surface of the cup holder.

6. The cup holder cleaning device according to claim 1, wherein once a satisfactory diameter of the brush heads are reached, the diameter adjustment mechanism is locked in position, which holds the position in place during the entire cleaning process.

7. The cup holder cleaning device according to claim 6, wherein the diameter adjustment mechanism is locked in position by a locking thumbscrew.

8. The cup holder cleaning device according to claim 1, wherein the upper enclosure is made of plastic.

9. The cup holder cleaning device according to claim 1, wherein the cleaning solution reservoir and the used cleaning solution reservoir contain cleaning solution and the used cleaning solution respectively and are capped by the cleaning solution reservoir cap and the used cleaning solution reservoir cap respectively.

10. The cup holder cleaning device according to claim 1, wherein the cleaning solution supply tube and the used cleaning solution vacuum tube are adjustable up and down along a first tube travel path.

11. The cup holder cleaning device according to claim 10, wherein a tube height adjustment mechanism coupled to the tube height adjustment mechanism lever allows for stabilized motion of the cleaning solution supply tube and the used cleaning solution vacuum tube up and down along a second tube travel path which accommodates and is directly proportional to the first tube travel path.

12. The cup holder cleaning device according to claim 1, wherein the cleaning solution tube containment cylinder and the used cleaning solution vacuum tube containment cylinder are contained within a series of bearing inserts that are periodically spaced within the main shaft.

13. The cup holder cleaning device according to claim 12, wherein each bearing insert is a ball bearing.

14. The cup holder cleaning device according to claim 12, wherein each bearing insert is a roller bearing.

15. The cup holder cleaning device according to claim 1, wherein the main shaft spins in an axial manner to drive the upper disc and thus the brush heads while the cleaning solution supply tube inside the cleaning solution tube containment cylinder and the used cleaning solution vacuum tube inside the used cleaning solution vacuum tube containment cylinder remain stationary.

16. The cup holder cleaning device according to claim 1, wherein the cleaning solution supply tube and the used cleaning solution vacuum tube are extended through a tube height adjustment mechanism which is mechanically coupled to the tube height adjustment mechanism lever.

17. The cup holder cleaning device according to claim 1, wherein the cleaning solution supply tube continue on to a cleaning solution pump and a used cleaning solution pump respectively which provide pressure and vacuum respectively, and then continue onto the cleaning solution reservoir and the used cleaning solution reservoir.

18. The cup holder cleaning device according to claim 17, wherein electrical power is derived from a 12-VDC plug which is provided with an internal fuse for overcurrent protection.

19. The cup holder cleaning device according to claim 18, wherein the brush motor control switch, the cleaning solution pump control switch, and the used cleaning solution pump control switch are wired in a series fashion with the brush motor, the cleaning solution pump, and the used cleaning solution pump, where a return conductor to the 12-VDC plug completes the circuit.

20. The cup holder cleaning device according to claim 18, wherein the resultant power is routed along a power cord where it is split in a parallel manner to the brush motor control switch, the cleaning solution pump control switch and the used cleaning solution pump control switch.

* * * * *